(12) United States Patent
Drabble

(10) Patent No.: US 8,091,255 B2
(45) Date of Patent: Jan. 10, 2012

(54) SEABED ORGANIC MATERIAL RELOCATING

(76) Inventor: Ray Drabble, Emsworth (GB)

( * ) Notice: Subject to any disclaimer, the term of this patent is extended or adjusted under 35 U.S.C. 154(b) by 127 days.

(21) Appl. No.: 12/312,738

(22) PCT Filed: Nov. 23, 2007

(86) PCT No.: PCT/GB2007/004507
§ 371 (c)(1),
(2), (4) Date: Sep. 28, 2009

(87) PCT Pub. No.: WO2008/062219
PCT Pub. Date: May 29, 2008

(65) Prior Publication Data
US 2010/0126047 A1 May 27, 2010

(30) Foreign Application Priority Data

Nov. 24, 2006 (GB) .................................. 0623450.4

(51) Int. Cl.
*E02F 3/00* (2006.01)
(52) U.S. Cl. ................. 37/307; 37/314; 37/317; 37/403
(58) Field of Classification Search .................... 37/307, 37/314–318, 321–324, 333, 335, 336, 341, 37/342, 403; 405/158, 159, 161, 164, 174, 405/180; 299/7–9, 18; 56/8
See application file for complete search history.

(56) References Cited

U.S. PATENT DOCUMENTS

| 4,070,061 | A | * | 1/1978 | Obolensky | 299/8 |
| 4,147,390 | A | * | 4/1979 | Deliege et al. | 299/8 |
| 4,368,923 | A | * | 1/1983 | Handa et al. | 299/8 |
| 4,391,468 | A | * | 7/1983 | Funk | 299/8 |
| 4,503,629 | A | * | 3/1985 | Uchida | 37/314 |
| 4,685,742 | A | * | 8/1987 | Moreau | 299/8 |
| 4,822,106 | A | * | 4/1989 | Wilson et al. | 299/9 |
| 4,896,445 | A | * | 1/1990 | Deal | 37/195 |
| 5,027,533 | A | * | 7/1991 | Holt et al. | 37/316 |
| 5,146,699 | A | * | 9/1992 | Lipford | 37/319 |
| 6,145,223 | A | * | 11/2000 | Flesen | 37/317 |
| 6,237,259 | B1 | * | 5/2001 | Myers, II | 37/315 |
| 6,364,119 | B1 | * | 4/2002 | Graham | 209/385 |
| 6,748,679 | B2 | * | 6/2004 | Myers, Jr. | 37/315 |
| 6,860,042 | B2 | * | 3/2005 | Hutchinson et al. | 37/322 |

FOREIGN PATENT DOCUMENTS

| FR | 780 571 A | 4/1935 |
| FR | 2 211 587 A | 7/1974 |
| NL | 1 007 940 C1 | 2/1999 |

* cited by examiner

*Primary Examiner* — Thomas Beach
*Assistant Examiner* — Matthew Buck
(74) *Attorney, Agent, or Firm* — Lambert & Associates; Gary E. Lambert; David J. Connaughton, Jr.

(57) ABSTRACT

An apparatus to gather and relocate benthic life and life supporting material for use in combination with a seabed or aquatic bed dredger, plough, mole or other seabed disturbing apparatus comprising a means of gathering the benthic life and life supporting material in, on or above the seabed in front of and in the path of the draghead or said seabed disturbing apparatus, thereby preventing entrainment or damage to the benthic life, and a means of releasing the benthic organisms and life supporting material via a directional exit duct, away from the work area.

1 Claim, 11 Drawing Sheets

SEABED ORGANIC MATERIAL RELOCATING

CROSS REFERENCE TO RELATED APPLICATION

This application is for entry into the U.S. National phase under §371 for International Application No. PCT/GB2007/004507 having an international filing date of Nov. 23, 2007, and from which priority is claimed under all applicable sections of Title 35 of the United States Code including, but not limited to, Sections 120, 363 and 365(c), and which in turn claims priority under 35 USC 119 to Great Britain Patent Application No. 0623450.4 filed on Nov. 24, 2006.

BACKGROUND TO THE INVENTION

1. Field of Invention

The present invention relates to mobile operations that disturb the seabed or aquatic bed, in particular, trailer suction dredging but also more generally to other trenching, ploughing or moleing operations to lay seabed pipelines or cables.

Whereas the invention is described in terms of "seabed" it is equally applicable to any aquatic benthic environment including an area of seabed, riverbed or lake bed.

All the aforementioned operations involving seabed-disturbing apparatus result in the inadvertent destruction of a significant component of the aquatic/marine ecology living on the bed of the sea or other aquatic environment. This unwanted impact complicates and lengthens the licensing process for dredging applications and other seabed development applications requiring detailed assessments of the effects on aquatic/marine ecology and frequently licence conditions to mitigate the impact.

The present invention provides an apparatus and method that gathers benthic[1] life and life supporting material from the seabed in front of the said seabed-disturbing-apparatus and relocates the said benthic material away from the immediate working area.

[1] Benthis=the term given to bottom dwelling species whose natural habitat is near the bottom of a lake stream river or ocean.

The invention will be described first in relation to its application to trailer suction dredging. Its potential application to seabed trenching, ploughing and moleing operations will then be discussed.

2. Description of the Related Art

Suction dredging dates from the 1930s when deck mounted pumps were used on vessels, in conjunction with suction pipes to remove material from the sea-bed or waterways.

Trailer suction dredging is an operation in which a vessel is provided with a pipe that is used to suck material, e.g. gravel, sand or silt, from the seabed or bed of a waterway and to discharge it into the hold of the vessel. One such system is described in patent No. NL1009096C as a pipe consisting of telescopic sections. The relative vertical positions of the sections are adjusted as the water surface rises or falls. The compensation mechanism can be controlled from the ship or from the device on the lower end of the pipe. Various techniques or combinations of techniques can be used to achieve the alterations in pipe length, e.g. extra mechanical drivers, a float system, fixed sections connected via grommets or a flexible section.

Suction dredging may be used for one of several purposes including:

The permanent removal of material from the aquatic/marine environments for the purposes of construction or change in channel depth or width known as capital dredging;

The periodic removal of sediment from the aquatic/marine environments in order to maintain navigation for vessels known as maintenance dredging;

The extraction of sand & gravel from the aquatic/marine environments for use as building materials or in coastal/flood defence schemes known as aggregate dredging The efficiency of systems developed on this principle has improved markedly with modern aggregate suction dredgers being able to extract up to 2500 tonnes material per hour. Technological improvements have focussed on a number of areas that include:

Swell/heave compensator devices
  See for example patents U.S. Pat. No. 4,102,064 and JP8239088
The efficiency of the suction arrangement
  See for example patents U.S. Pat. No. 2,961,782, U.S. Pat. No. 6,189,243 and U.S. 5,979,088
Minimising the silt generated by suction dredging
  See for example patents U.S. Pat. No. 4,541,927 and JP2004003210
Selectivity in the particle size of material entering the suction pipe
  See for example patent JP7238566
The efficiency of the cutting head
  See for example patents: WO2004111354 and CN1488822

With the above-mentioned enhancements, the basic principle remains unchanged: i.e. use of a vessel provided with a pipe that is used to suck material, e.g. gravel, sand or silt, from the sea bed or bed of a waterway and to discharge it into the hold of the vessel.

3. Outline of the Problem

The seabed constitutes one of the most significant components of marine ecosystems, providing the habitat for approximately 98% species in comparison with 2% species that occupy the water column. Similar ratios apply to estuarine environments. In seabed environments, the benthic (seabed) fauna either lives on or attached to the seabed surface as epibenthic species (including crustacea such as crabs and lobsters, molluscs such as scallops and mussels as well as demersal fish species including plaice and sole) or as infauna occupying predominantly the top 0.5 m sediment. Many species of fish forage the seabed for food, and significantly certain species bury themselves in the sediment to provide cover from both prey and predators.

In the light of the above, one of the principal impacts of seabed disturbing operations and marine aggregate dredging, in particular, is the loss of benthic species from an area which has been dredged. Crustacea, fish and other organisms are sucked up with the targeted sand/gravel, leaving the seabed in the wake of the dredge largely devoid of organic material. The term organic used here is defined as material of, relating to, or derived from living organisms. Organic material whether in the form of biomass (live flora or fauna) or detrius (dead material derived from living organisms) is vital for recycling of nutrients to sustain ecosystems. Studies in relation to marine aggregate extraction have shown that a loss of up to 90% of biomass can result from dredging. In addition, a substantial proportion of the detrius such as shell debris will also be removed from the seabed/water bed during suction dredging.

Currently no method of suction dredging has been developed to reduce the organic material entering the draghead. A means of screening out a significant proportion of the organic material entering the draghead and returning it to the seabed would markedly reduce the impact of dredging on marine/aquatic ecosystems and accelerate the ecological recovery of benthic habitats. In relation to aggregate dredging, a method of operation which minimises the destruction to seabed ecology would accelerate the licensing process, reduce contamination within cargoes and so improve the quality of the aggregate resource being extracted.

SUMMARY OF THE INVENTION

The object of the present invention is to improve aquatic mobile operation apparatus so that destruction of the aquatic benthic environment is limited.

STATEMENT OF INVENTION

According to the first aspect of the invention there is provided aquatic mobile operation apparatus including operative means and means for moving organic material from the path of apparatus.

According to a second aspect of the invention there is provided apparatus for moving organic material from the aquatic benthic environment, including means for use with aquatic mobile operation apparatus.

The principle of the invention is to skim the upper sediments of the seabed/aquatic bed in the path of a suction dredger and to channel organic material via a route which avoids the draghead. Because a suction dredger is non-discriminatory in what it removes from the seabed, any significant reduction in the organic material which is 'pumped' inboard is beneficial to the local ecosystem and to the dredging company. The present invention, while not avoiding disturbance of the ecosystem, will ensure the survival of high proportion of organisms and allow more rapid recovery to the unperturbed conditions than is currently possible.

One means of removing organic material from the path of the draghead is by deploying a beam trawl from the dredger, in front of the draghead, to catch the organic material on or in the undisturbed seabed and prevent this material entering the draghead. Beam trawls are ideal for use on mixed sediments of sand/gravel in which commercial aggregate licence areas are found.

The preferred means of transporting the material past the draghead and returning it to the seabed is by means of a bypass duct which would form an isolated but composite part of the draghead housing.

However, this invention would apply to any more temporary arrangement whereby a trawl and duct is used to funnel organic material into an escape route past the suction of the draghead Capture and safe removal of organic material from the path of the draghead could also be provided by other means including: a funnelled duct deployed from the dredger, in front of the draghead or end of the suction pipe; an auxiliary suction forward of the main suction inlet of the draghead to abstract organic material from the surface sediments prior to the main draghead suction passing over; or a plough arrangement in front of the draghead which channels organic material into a bypass pipe for releasing behind the draghead.

According to a third aspect of the invention there is provided a method of aquatic mobile operation including the steps of moving the organic material from the path of the operation prior to operating.

BRIEF DESCRIPTION OF THE DRAWINGS

To help understanding of the invention, various embodiments thereof will now be described by way of example and with reference to the accompanying drawings, in which.

DETAILED DESCRIPTION OF THE PREFERED EMBODIMENT

Figure 1:
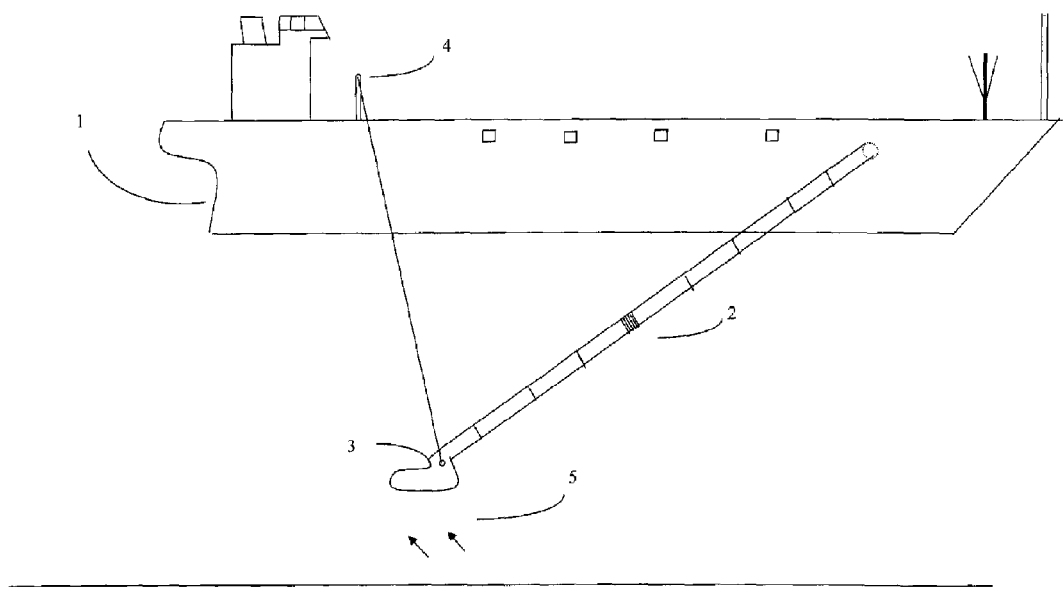
FIG. 1 is a side view of the prior art showing a typical trailer suction dredger with suction pipe deployed.

In FIG. 1, a typical trailer suction dredging operation is shown comprising: a hull (1); at least one pump suction tube mounted to the exterior of the hull (2); the suction inlet being located below the water line of the hull, and each being pivotally associated with the hull; at least one draghead (3) which is adapted to ride in part above the sea bed its vertical position being maintained by a heave compensating device (4); the draghead is attached via a suction tube to the hull inlet. Under this arrangement, organic material on the seabed is indiscriminately sucked up into the hopper of the vessel from the draghead (5) via the suction tube.

Figure 2:
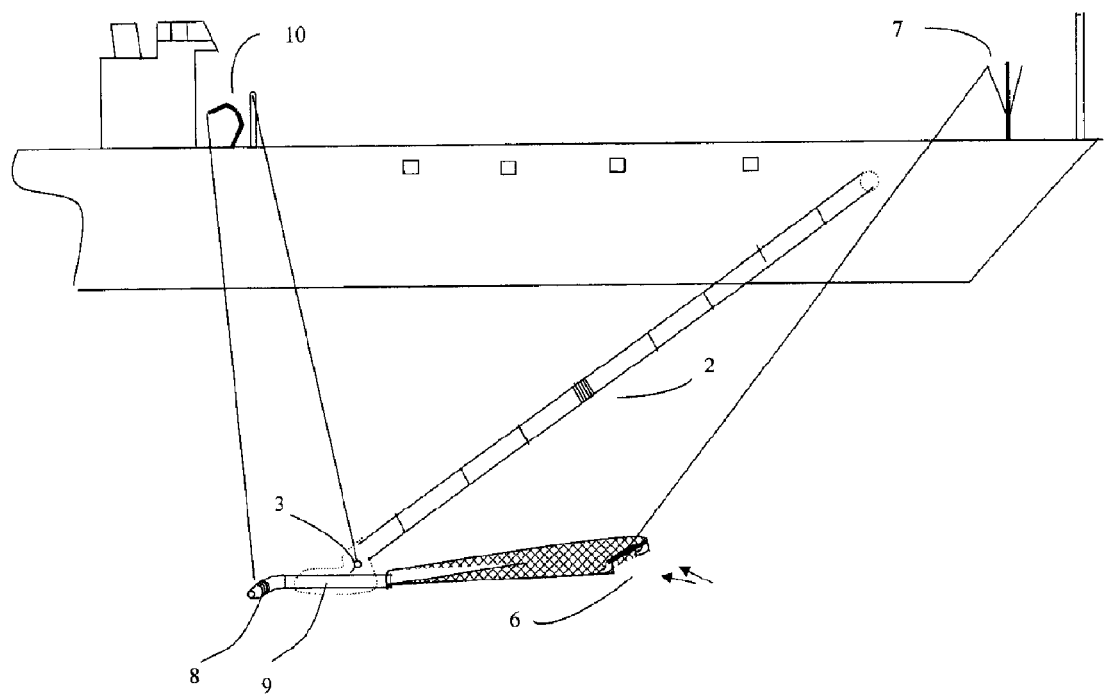
FIG. 2 is a side view of a trailer suction dredger according to the present invention.

In FIG. 2, the traditional suction dredging system shown in FIG. 1 is enhanced by the deployment of a beam trawl (6) from the dredging vessel in front of the draghead and suction pipe, to catch organic material on the undisturbed seabed and prevent this material entering the draghead and suction pipe. The beam trawl is streamed via a trawl wire (or warp line) rove through a forward derrick (7)*[2]. The aft end of the trawl is attached to a bypass pipe (8) which in FIG. 2 is shown as an isolated but composite part of the draghead housing. The bypass pipe has a flexible coupling aft of the draghead housing (9) which allows the opening to be directed to the left or right of the dredge track, away from the lateral direction of dredging, allowing organic material to exit away from the direction of subsequent dredging. The position of the exit pipe may be controlled by a wire attached to a deck mounted crane (10). Alternatively it could be controlled by a motor arrangement.

[2] The warp line could alternatively be rove through a forward fairlead and attached to a drum.

A commercial beam trawl will typically channel a high proportion of non-targeted species and juvenile fish into the net along with the adult targeted species. This by-catch has been reduced by regulating the size of mesh used in trawls but as a net fills, inevitably the method becomes less discriminatory and a whole range of organic material will be brought inboard with the catch.

The efficiency with which a commercial beam trawl can disturb and catch organic material in a net can be harnessed in this invention by channelling that material into an escape route which will bypass the suction of the draghead and return that organic material to the seabed/aquatic bed behind the dredger.

Figure 3:
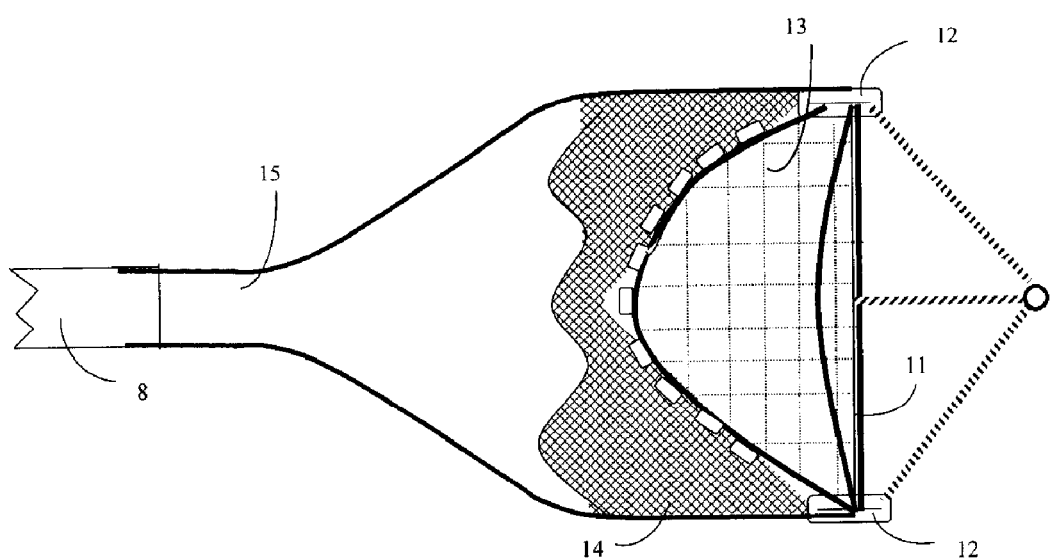
FIG. 3 is a bottom view of a beam trawl according to the invention.

In FIG. 3, a typical beam trawl is shown in plan view. Beam trawling has historically been used to catch demersal fish, i.e. fish whose habitat is on or in the seabed sediments, and their use in commercial fisheries continues today. Because the gear used is specifically targeting fish living or feeding on the seabed, the trawls are designed to maximise contact with the seabed, disturbing fish/other organisms and causing them to swim clear of the sediment and so be caught in the net. The beam trawl comprises a rigid beam (11) held off the seabed by two beam shoes (12). A chain mat forms the base of the trawl (13) and the net (14) is cone-shaped, tapering to a cod end at the downstream end (15). In FIG. 3, the cod end is not closed but attached to the bypass pipe (8) also shown in FIG. 2. The net headline is attached to the beam and the footrope is attached to the beam shoes; thus the mouth of the net is fixed in an open position. Use of a chain mat (13) or 'tickler chains' at the mouth of the net are designed to penetrate and so disturb the upper few centimetres of the sediment causing fish such as plaice and sole or scallops to swim upwards and thereby get caught by the net being dragged through the water. Tickler chains unlike a chain mat are chains secured between the beam shoes and do not form a matrix. However, a chain mat has the advantage of preventing large boulders from entering the net and they are also known to be less damaging to benthic organisms than tickler chains. A penetration depth of 6-8 cm can be expected in softer sediments. While some organic and inorganic suspended sediment will remain in suspension and pass through the net into the bypass tunnel heavier, more dense inorganic material will pass rapidly back to the seabed through the chain mat.

In order to maximise the capture of organic material rather than simply target adult fish, the trawl net used would require a fine mesh size typically used for epibenthic sampling rather than the larger mesh sizes used for commercial fishing[3]. Thus organic material entering the net is less likely to escape through the walls of the net (and be caught in the suction of the draghead) prior to entering the bypass pipe.

[3] Scientific sampling using a beam trawl is highly effective in capturing organic material. Experience with a 4 m beam trawl in the English Channel resulted in the accumulation of between 1 and 3 tonnes of organic material in 15 minute deployments.

The dredging operation requires little modification to accommodate the present invention. The trawl will work, irrespective of the speed of the dredger, which typically will operate at speeds of 0.5 knots into tide. Negligible additional loading will be placed by deploying the trawl since material is not being accumulated in the trawl net but passed via the bypass pipe back into the open water. Furthermore, the minor increase in depth of seabed created by the trawl can be accommodated by the draghead which is designed to adjust for minor changes in the morphology of the seabed.

Figure 4:
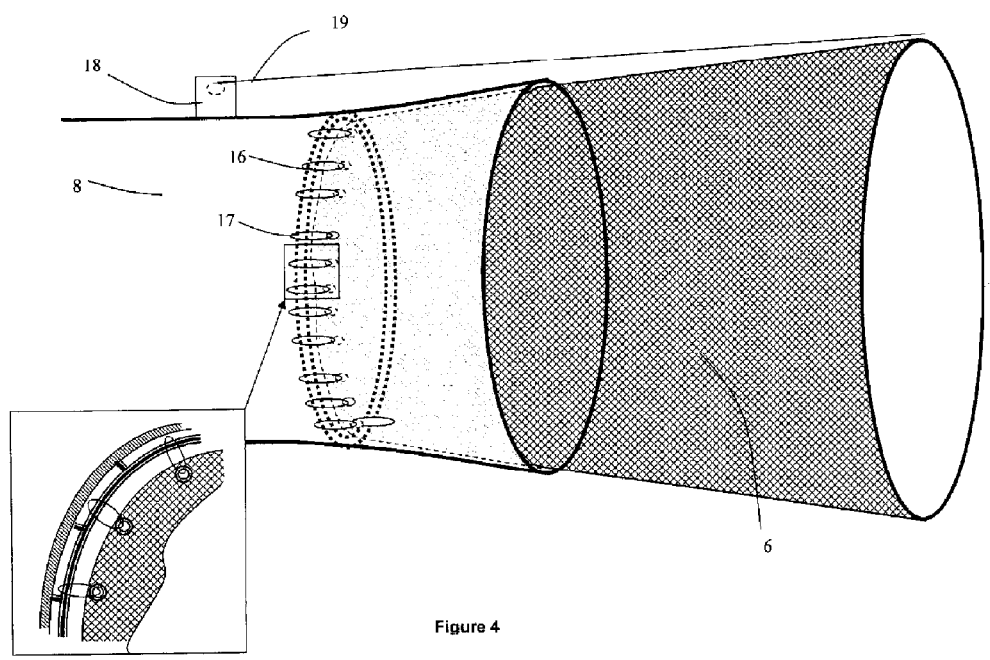
FIG. 4 is a side view of the attachment of the cod end of the trawl net to the bypass pipe or duct.

In FIG. 4, a suggested means of attaching the open cod end of the trawl is shown, achieved by means of a securing rail which is permanently fixed to the interior of the bypass pipe close to the inlet (16) to which can be attached securing rings (17) which connect the cod end of the trawl (6) to the bypass pipe (8). The circumference of the cod end of the trawl will be similar in size to the diameter of the securing rail ensuring a tight fit so as to allow organic material entering the trawl to 'pass safely though the net' (the speed of passage determined by the speed of the vessel through the water) into the bypass pipe and so beyond the draghead and exit back into the open sea downstream of the draghead. A control device (18) is attached to the top of the bypass pipe, comprising a self recoiling 'tell-tale' wire (19) connecting the bridle of the trawl net to the fixed position of the bypass pipe. The control device will trigger a signal to switch off the main dredging pump when the distance between the trawl net bridle and the bypass pipe is less than a critical distance. Thus, if the trawl net snags on the seabed or the warp line severs, the dredging pump will shut down before the trawl net is in danger of being sucked into the draghead causing damage.

Figure 5:
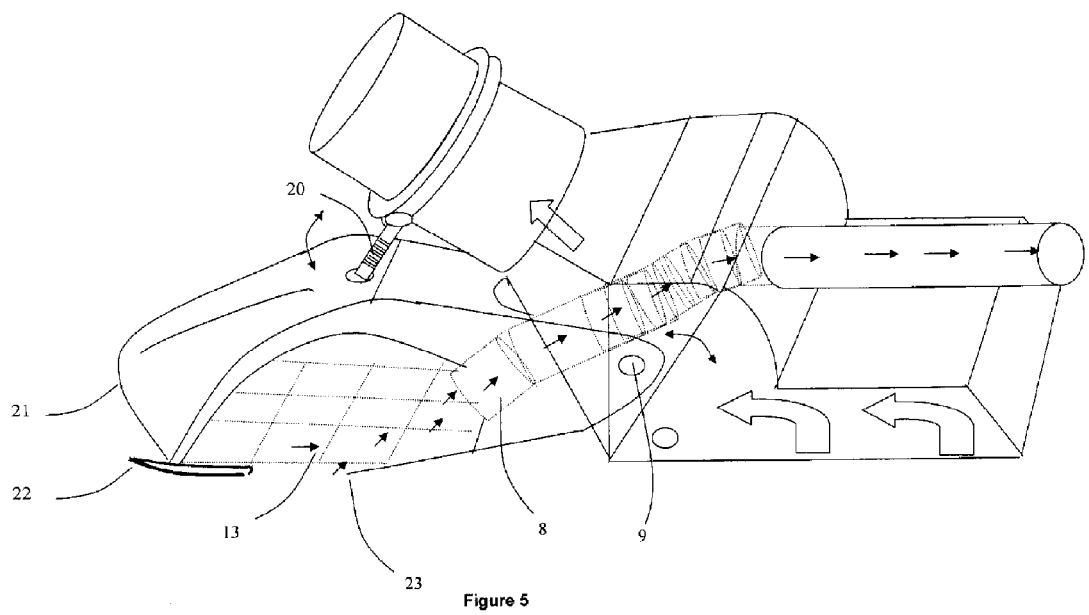
FIG. 5 is a perspective view of alternative means of gathering and relocating benthic life according to the invention.

FIG. 5 shows an alternative configuration for the apparatus for gathering and relocating benthic life and life supporting material, whereby it forms an integral part of the draghead assembly. In this representation, a cut away view of the preprocessor is shown hinged to the main draghead (9) allowing it to move freely in an arc to accommodate variations in the seabed. Contact with the seabed is maintained by a spring loaded arm (20) which is secured to a fixed point on the main draghead suction pipe. A bullet shaped front end (21) provides protection to the modified drahead and minimizes impact from larger debris on the seabed such as large cobbles and small boulders. The bypass pipe (8) described in the previous drawings routes internally through the modified draghead housing past the main draghead suction pipe and to an exit port clear of the draghead suction zone. Suction will be provided either by a venturi lift or water mover employing the coanda effect. Other features that may be incorporated are a skids (22) to allow the draghead to ride over rough ground, a chain mat (13) to agitate the seabed an encourage fish/bivalves/crustaceans to swim clear of the seabed and a small digging blade (23) orientated in the direction of travel to penetrate the top level of sediment.

Figure 6:
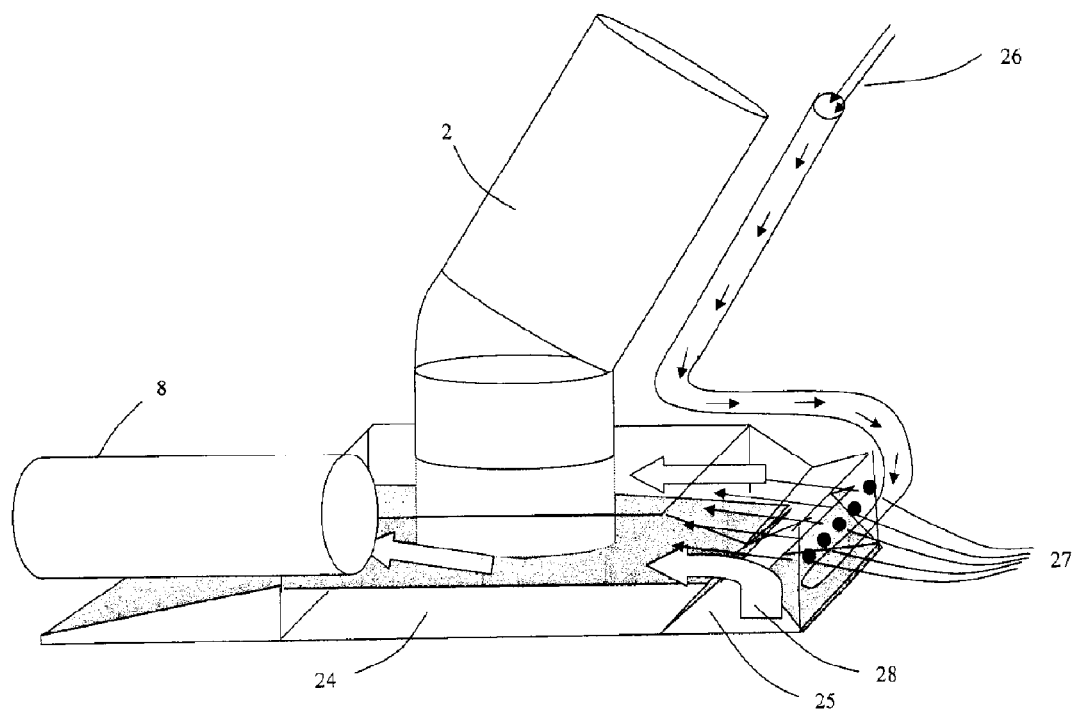
FIG. 6 is a perspective view of a further alternative means of capturing organic material from the seabed and transporting it past the main operation of seabed disturbing apparatus according to the invention.

FIG. 6 shows a further alternative means for gathering and relocating benthic life and life supporting material from the seabed which would otherwise enter the main suction pipe of the draghead (2). The arrangement shows a modified draghead (24) which incorporates an auxiliary suction inlet (25) at the forward end, in the direction of travel. A pressurized water supply (26) is used to power water jets (27) at the front end of the draghead. The high pressure flow of water from the jets enters a venturi which creates an area of reduced pressure generating suction via a venturi lift (28) in the auxiliary suction inlet and so lifting organic material from the seabed and channelling it into the bypass pipe (8) above. Auxiliary suction to skim the top, organic layer of the seabed in the path of the draghead and aid transport of the same behind the draghead, while provided here by means of a venturi, could alternatively be provided by other means such as a mechanical auxiliary suction pump fitted local to the apparatus.

Figure 7:
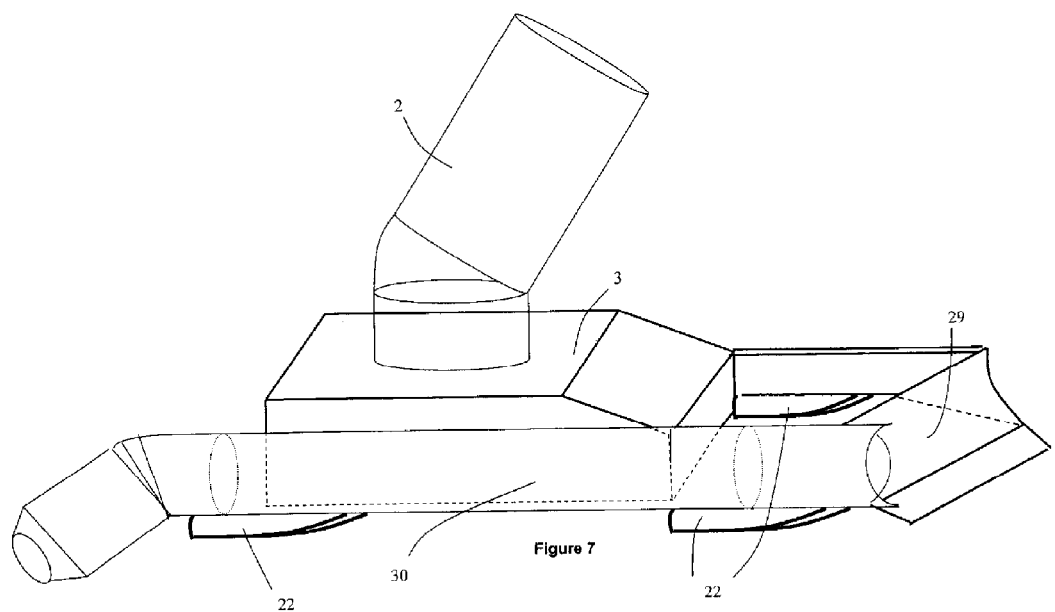
FIG. 7 is a perspective view of a further alternative means for capturing organic material and transporting it past the main operation of seabed disturbing apparatus according to the invention.

FIG. 7 shows yet a further alternative means for gathering and relocating benthic life and life supporting material from the seabed which would otherwise enter the main suction pipe of the draghead. In this arrangement, a simple plough (29) is used to disturb the top layer of sediment and channel the material upwards and in the direction of a bypass duct (30) which is shown attached to the 'outboard' side of the draghead body (3) and extends both in front of and behind the draghead and main suction tube (2). It could however, equally form an integral part of the draghead assembly. The plough could either be a single blade or a double blade which could divert material away from the draghead suction into the bypass tube. As with the configuration described in FIG. 5, skids (22) would be attached to support the bypass tubes relative to the seabed.

Figure 8:
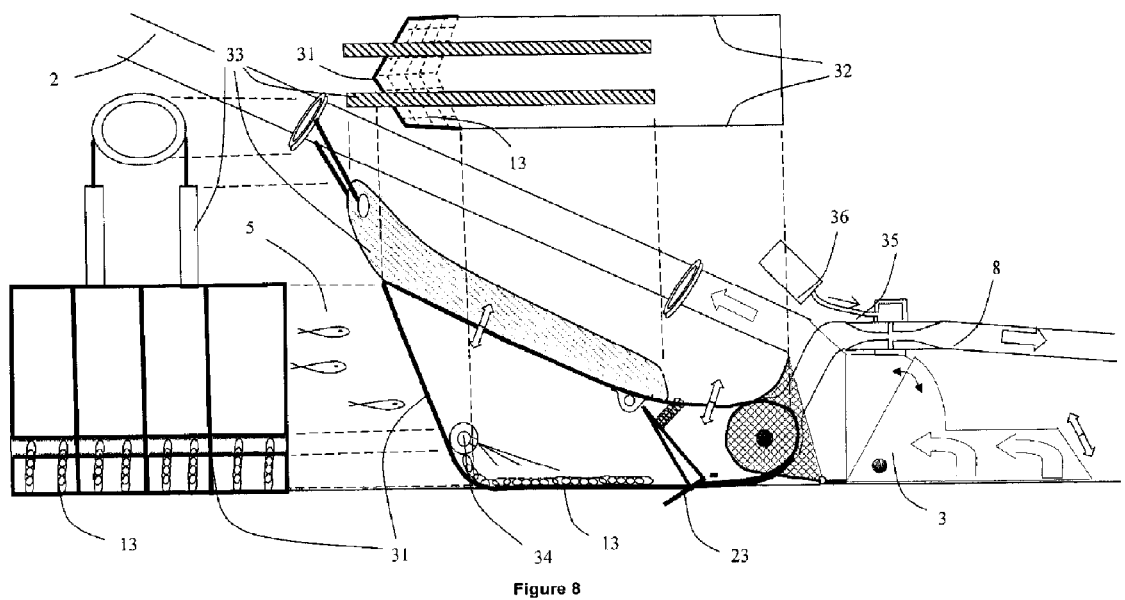
FIG. 8 is a side perspective view of further alternative means for gathering benthic life and life supporting material and relocating it according to the invention.

In FIG. 8, a further alternative means of gathering and relocating benthic life (5) and life supporting material is shown which would operate in a similar fashion to a trawl net with a free flow of water past a 'bow shaped' crash grid (31) at the 'mouth' of the apparatus. The sides of the apparatus (32) are shown in the plan view but not the side view. The apparatus would be supported and towed by a tow web (33) attached to a strong point on the main dredger suction pipe (2) close to the seabed end of the tube attached to the draghead (3). A chain mat (13) would be fitted to the base of the apparatus to agitate the seabed in front of the bypass duct (8). A bumper bar (34) would also agitate the benthic bed by directing water from pressurized water jets. A spring-loaded digging blade (23) supported by arms would scrape the surface of the sediment to lift organic material into suspension. Material in suspension would be sucked into a bypass duct via a coanda device (35), powered by a locally mounted pump (36).

Figure 9:
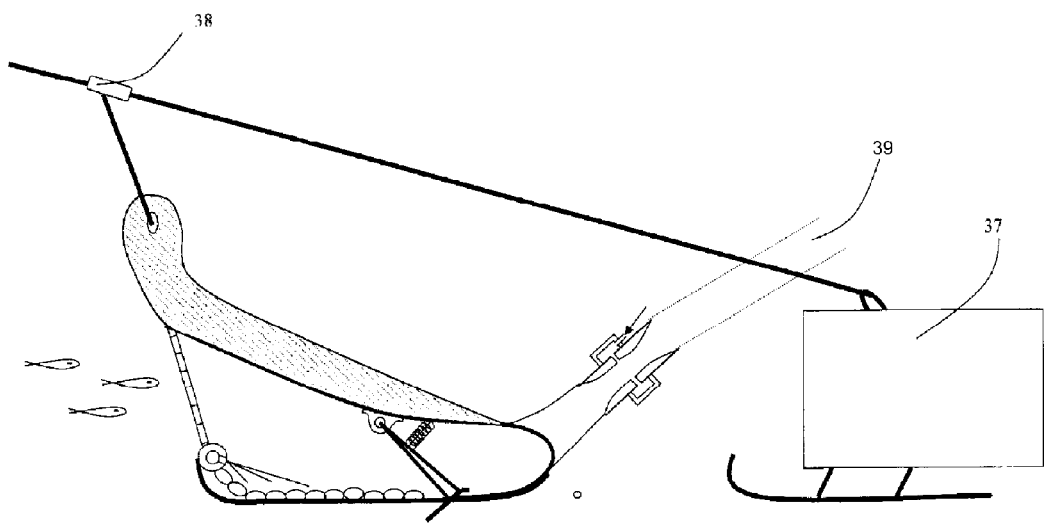
FIG. 9 is a schematic of how the apparatus of FIG. 8 is be used in conjunction with trenching ploughing or moleling equipment such as that used for pipeline laying/cable laying to gather and relocate benthic life away from the work area.

In FIG. 9, a means is shown whereby an apparatus for gathering and relocating benthic life and supporting material, of a similar design to that described by FIG. 8, could be used in conjunction with a seabed plough, mole or tractor or other seabed disturbing equipment (37) used, for example, in pipe laying or cable laying. In this configuration the tow web for the apparatus would be clamped (38) to the main tow wire from the towing/operating vessel. The bypass duct (39) could be directed away from the working area by a powered propulsion unit to allow discharge of the benthic life in an area where it would be no longer subject to disturbance.

Figure 10:
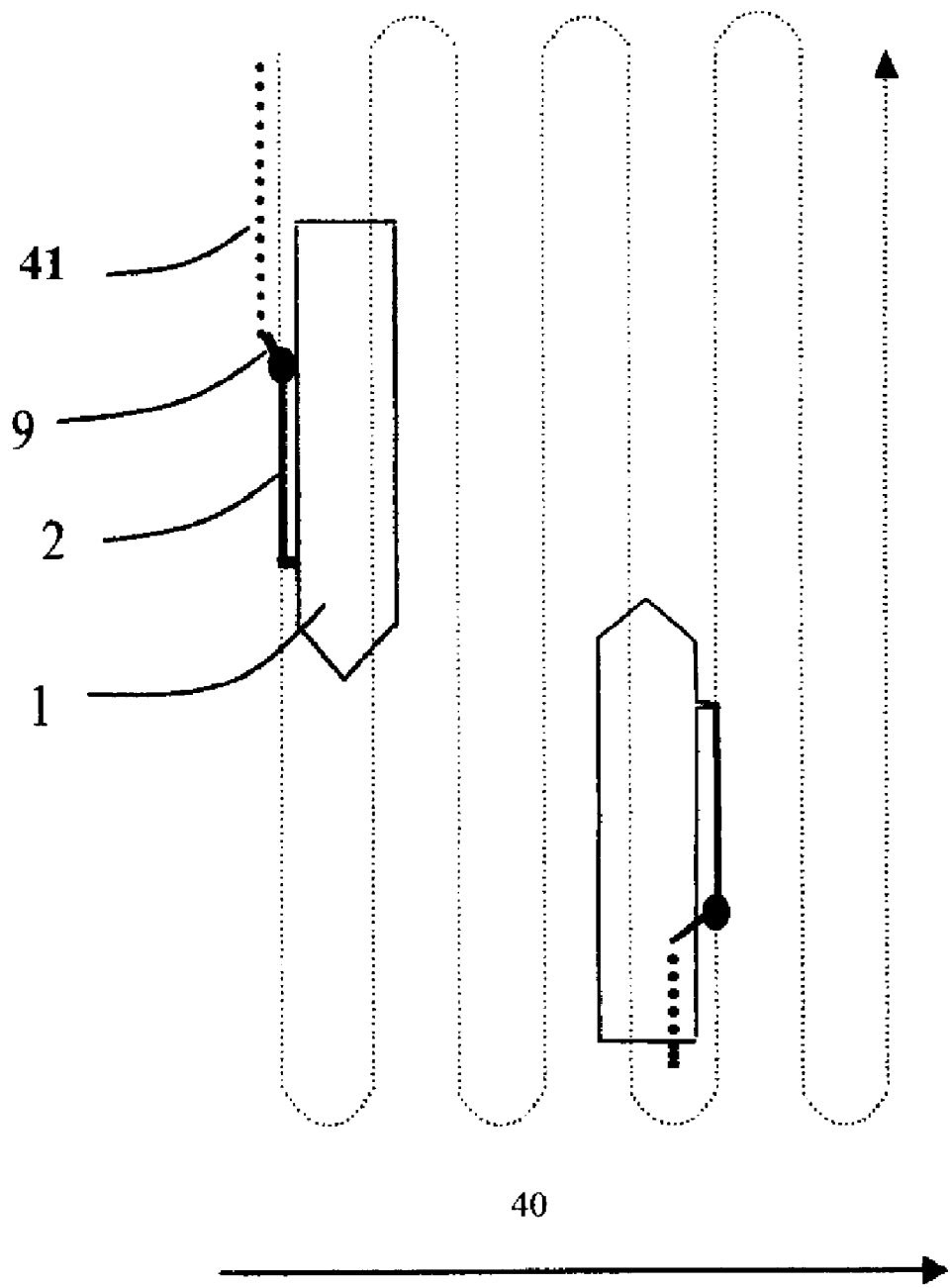
FIG. 10 is a plan view of a faunal friendly dredging operation indicating a means of using a directional outlet for the bypass pipe to allow organic material to be deposited away from the transverse direction of dredging.

In FIG. 10, a plan view is shown of a dredging operation, the proposed dredge track being shown as a dashed line and the transverse direction of dredging being depicted by the arrow (40). The flexible coupling of the outlet pipe (9), the position of which is controlled by an actuator mechanism similar to that described in FIG. 9, allowing the angle of the bypass pipe outlet to be directed away from the transverse direction of dredging and positioned so as to reduce the likelihood of organic material (41) being trawled successively with each parallel pass of the dredger over the seabed.

Figure 11:
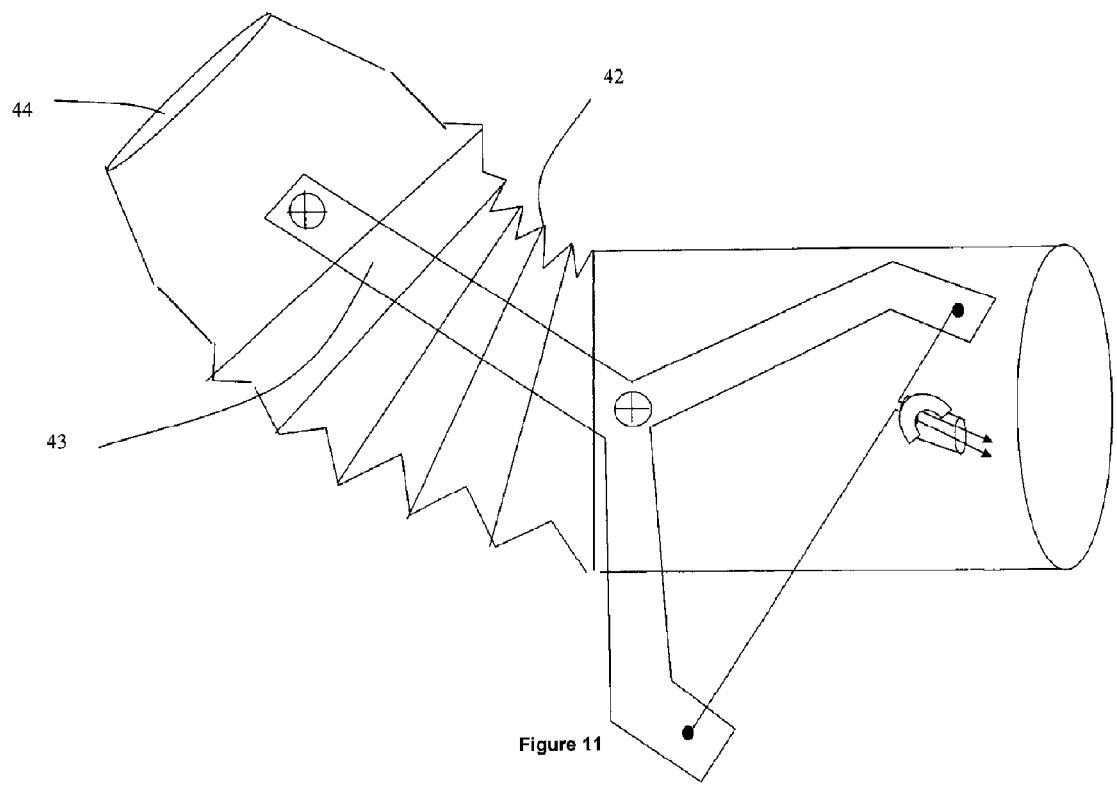
FIG. 11 is a side perspective view of a configuration for the end of the bypass pipe which will allow the organic material to be ejected safely clear of the transverse direction of dredging.

In FIG. 11 a suggested arrangement for the end of the bypass pipe is shown, the omni-directional movement of which is facilitated by a flexible coupling (42) controlled by a bridle (43) which forms part of an actuator mechanism. The end of the outlet pipe is tapered (44) to create a jet effect ensuring material is ejected well clear of the draghead.

The invention claimed is:

1. Aquatic mobile operation apparatus including a sea bed disturbing apparatus and means to gather living or life sustaining benthic material from the path of the said sea bed disturbing apparatus and move said benthic material to relocate it away from the path of said sea bed disturbing apparatus; wherein the sea bed disturbing apparatus is selected from the group consisting of a dredging apparatus, trenching apparatus, ploughing apparatus and moleing apparatus;
    wherein the means to gather living or life sustaining benthic material uses a duct means; and
    wherein an outlet of a bypass duct is directed away from the path of the sea bed disturbing apparatus using a controllable propulsion mechanism to influence its position, the outlet keeping the living or life-sustaining benthic material under the surface of the water and near the sea bed.

* * * * *